United States Patent [19]
Weigert

[11] 3,937,927
[45] Feb. 10, 1976

[54] FRAME LOCATION SYSTEM

[75] Inventor: Hans Weigert, Woodcliff Lake, N.J.

[73] Assignee: Ragen Precision Industries, Inc., North Arlington, N.J.

[22] Filed: June 21, 1974

[21] Appl. No.: 481,556

[52] U.S. Cl. ... 235/61.11 R; 235/61.7 R; 235/92 V; 353/26 A
[51] Int. Cl.² ............ G03B 23/12; G06 K 7/10; G06G 7/28
[58] Field of Search... 40/28 A; 235/61.7 R, 61.11 E, 235/92 V, 92 PL, 61.11 R, 61.12 N; 353/26; 360/72

[56] References Cited
UNITED STATES PATENTS

| | | | |
|---|---|---|---|
| 3,191,006 | 6/1965 | Avakian | 235/61.7 R |
| 3,353,161 | 11/1967 | Toscano | 235/92 PL |
| 3,585,372 | 6/1971 | Bell | 235/92 PL |
| 3,793,507 | 2/1974 | Blizard | 235/61.7 R |
| 3,793,508 | 2/1974 | Maggi | 235/92 V |
| 3,802,771 | 4/1974 | Mickelson | 353/26 |
| 3,820,884 | 6/1974 | Sone | 353/26 |

Primary Examiner—Daryl W. Cook
Assistant Examiner—Robert M. Kilgore
Attorney, Agent, or Firm—Popper & Bobis

[57] ABSTRACT

Frame location system for microfilm retrieval system. Frame address of desired frame is stored in first reversible counter having maximum count greater than the maximum possible number of frames in a roll of microfilm. Frame address of frame currently being viewed is stored in second reversible counter of same count capacity. A burst of pulses equal to capacity of both counters causes both to count up. First counter to overflow gates burst pulses into third reversible counter. Second counter to overflow terminates count in third counter. As microfilm moves, optical sensors sense frame identifying "blips" on microfilm thereby reducing count in third counter and slowing film to halt when desired frame is in position at viewing station.

10 Claims, 7 Drawing Figures

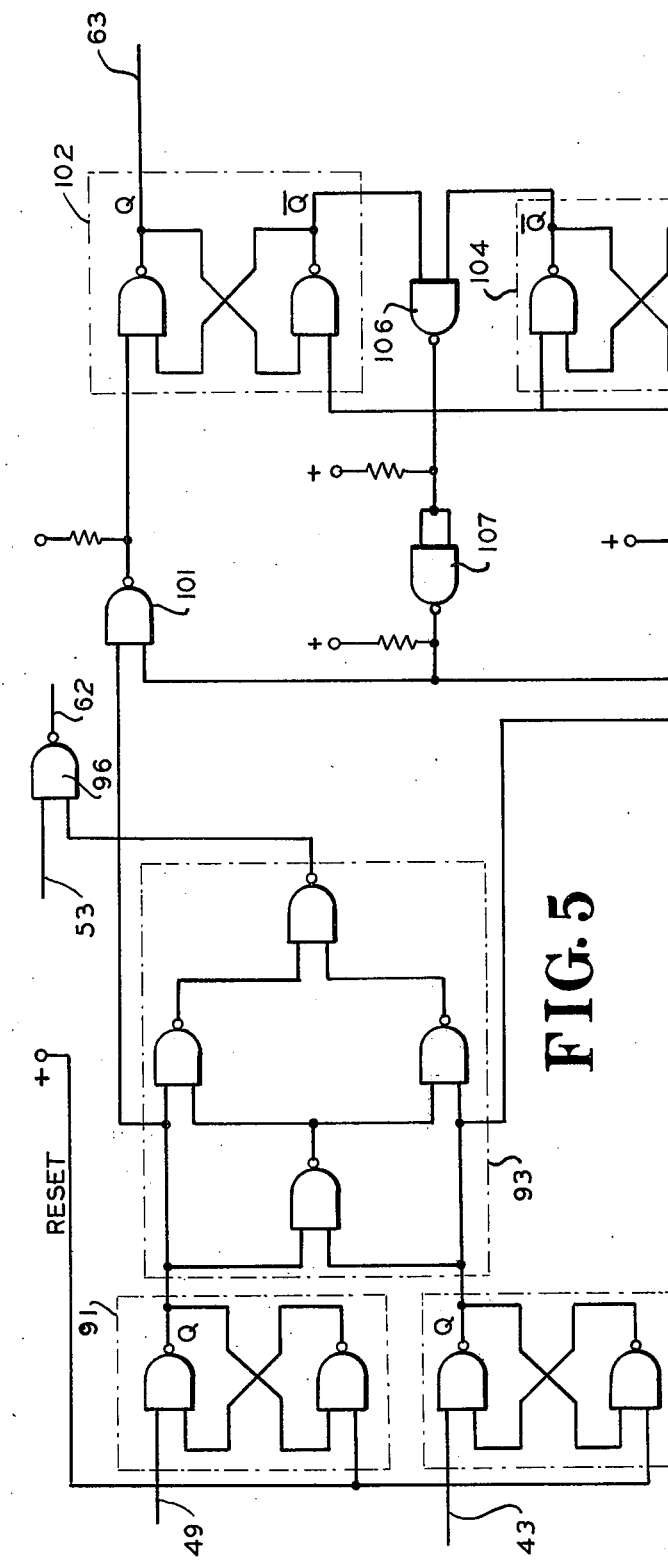
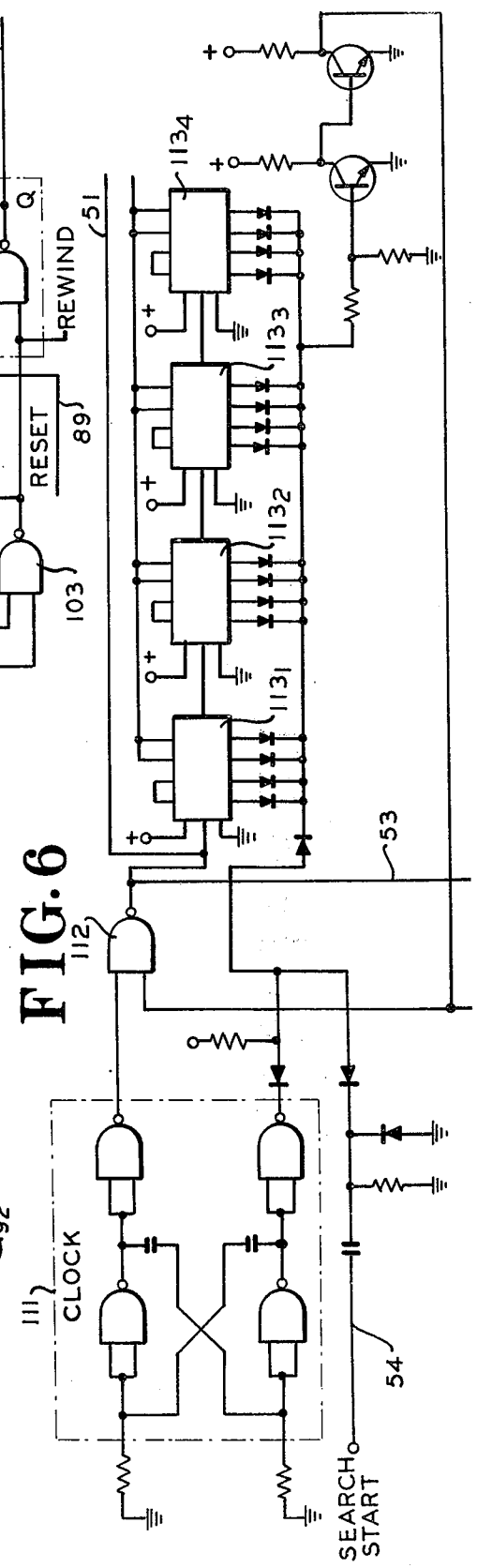
FIG. 5
FIG. 6

FRAME LOCATION SYSTEM

BACKGROUND OF THE INVENTION a. Field of the Invention

Broadly speaking, this invention relates to frame location for a strip record medium retrieval system. More particularly, this invention relates to a frame location system for use with a microfilm retrieval system and is particularly useful in presenting a selected frame on a microfilm strip or reel to a predetermined station, such as a viewing station.

b. Discussion of the Prior Art

As known to those skilled in the microfilm retrieval art, a typical microfilm retrieval system includes apparatus for storing or housing a plurality of microfilm reels or strips and for presenting or delivering a selected microfilm reel or strip to a viewing station where the strip or film is unreeled and the documents are presented for viewing. Typically, each microfilm reel or strip has a plurality of frames thereon in which documents, or portions of documents, are recorded by the microfilming process. Each frame on each microfilm strip or reel is identified by what is generally referred to in the art as an "address," typically the numerical sequence or chronological order in which the frame appears on the microfilm. The frames and, hence, the documents recorded thereon are typically located by counting the frames.

In general, the frames are counted by means of frame or document indicia which are associated with the frames, and hence the documents, in a predetermined manner and which indicia are typically opaque to light whereby they may be sensed and counted by photodetectors. These frame or document position marks are typically referred to by those skilled in the art as "blips." Thus, for example, a microfilm strip having 10,000 frames thereon would have the frames numbered beginning with 0000 and ending with 9999 and frame address 6000 would be the address of the six-thousandth frame (and hence any document recorded thereon) appearing chronologically on the microfilm strip or reel. Accordingly, documents are typically retrieved and presented to a viewing station by selecting the numerical address of the frame in which the document is recorded on the microfilm strip or reel.

Numerous frame location systems for microfilm retrieval systems are known to the prior art; however, such prior art frame location systems are exceedingly complex and expensive and generally include inherent operating limitations which render them highly specialized for a particular purpose and thereby unsuitable for general commercial use. For example, the electronic, high-speed, strip record accessing control circuitry disclosed in U.S. Pat. No. 3,435,310 to E. F. Bradley, has the operating limitation that the strip record medium must have indicia or documents recorded thereon at predetermined intervals proportional to the increments to be accessed.

SUMMARY OF THE INVENTION

The present invention provides a frame location system which is comparatively non-complex and inexpensive and which is of general commercial utility and does not include the above-noted inherent limitations with regard to the typical specialization of prior art frame location systems.

The gist of inventive concept of the present invention, and by way of example, is the utilization of the limited or maximum count capacity of a plurality of counters to provide a count which is indicative of the difference between the address of the frame last presented to the viewing station and the address of the selected frame next desired to be presented at the viewing station. Then, in accordance with this difference signal, a signal is generated to move the microfilm so that the desired frame appears at the viewing station.

DESCRIPTION OF THE DRAWINGS

FIG. 4 is assembled immediately to the right of FIG. 3, are a block diagrammatic schematic of an illustrative embodiment of the frame location system of the present invention;

FIG. 5 is a block diagram schematic of an illustrative logic arrangement for providing positive and negative direction command signals to either advance or retract the microfilm strip past the viewing station;

FIG. 6 is a block diagram schematic of an illustrative search counter, including a self-contained clock generator, for providing the search burst outputs.

DETAILED DESCRIPTION OF THE INVENTION

Figure 1:
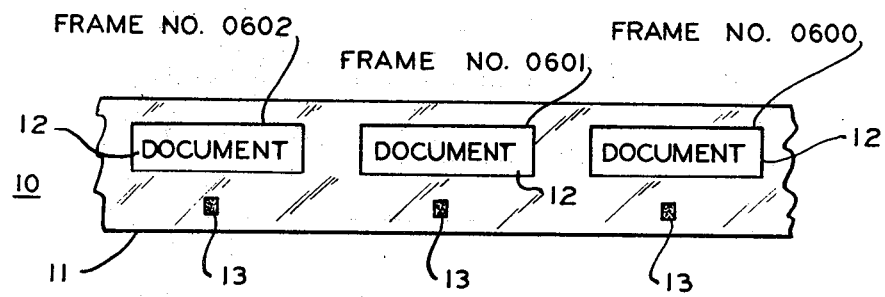
FIG. 1 is a partially diagrammatic view of a typical microfilm strip.

FIG. 1 depicts a portion of a typical microfilm 10, for example, of a type that may advantageously be employed within the microfilm retrieval system according to the present invention. As shown in FIG. 1, microfilm 10 comprises a transparent base 11, for example of cellulose acetate, having a plurality of document records 12 photographically, or otherwise, recorded on successive frames thereof. A reference mark or blip 13 is positioned proximate each frame or document in the film to assist in the identification and retrieval thereof, as will be more fully explained hereinbelow. Normally, each of the blips 13 comprises an opaque region on a transparent field, i.e. the film base 11, but the invention is not so limited and the blips may equally well comprise transparent regions on an opaque field, regions of magnetized material, notches or apertures in the film, etc., etc.

Figure 2:
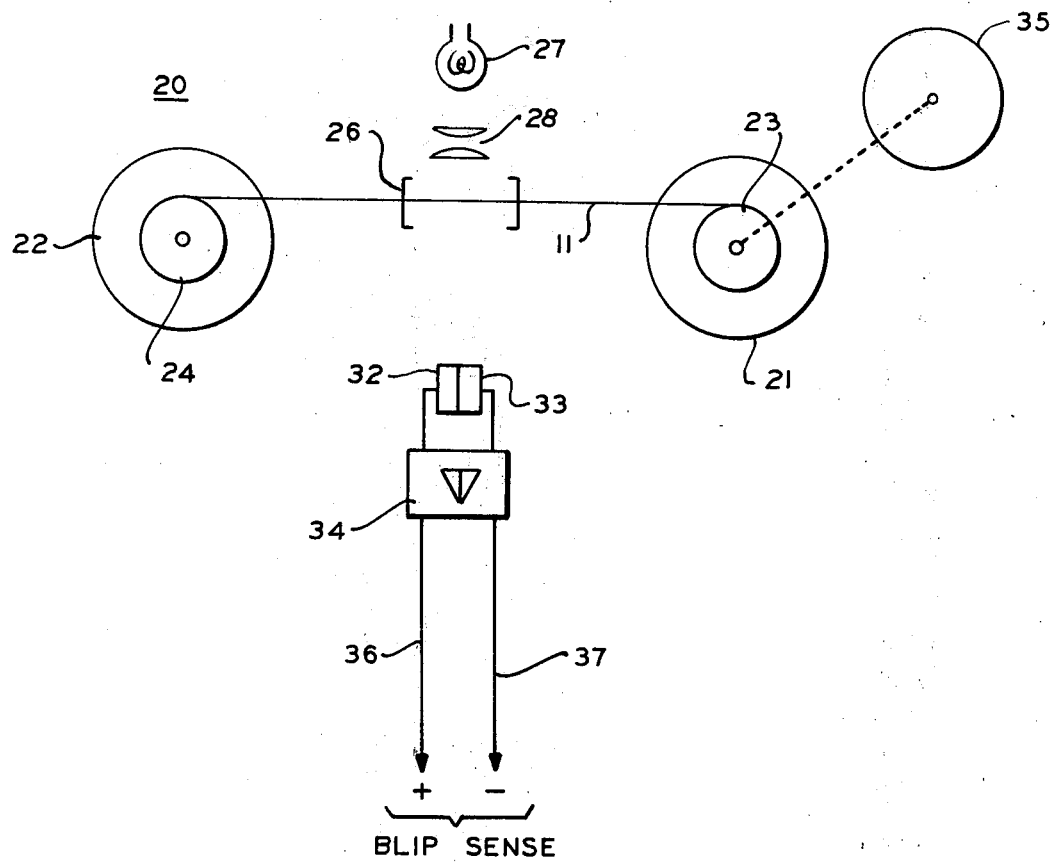
FIG. 2 is a diagrammatic illustration of the manner in which the microfilm strip is moved past a viewing station and the blips associated with the frames are sensed by a photodetector sensing system.

FIG. 2 illustrates a well-known system for transporting a microfilm under examination past a viewing station and for sensing the frame-identifying blips carried by the microfilm.

As shown, this transport system 20 comprises a take-up motor 21 and a rewind motor 22 respectively mounting the microfilm take-up and supply spools 23 and 24. A viewing station 26 is positioned intermediate rewind motor 22 and take-up motor 21. A light source 27, for example, an incandescent bulb, and a condensor lens assembly 28 direct light onto the microfilm to permit visual display of the frame currently in the viewing station by means of a conventional projection lens and screen (not shown).

For use with the microfilm retrieval system disclosed herein, the conventional transport system above-described is supplemented by a pair of photodetectors 32 and 33 each comprising, for example, a photocell or a photodiode. A projection lens 31 is positioned such that it images onto photodetectors 32 and 33 that portion of the microfilm 10 that carries the frame-identifying blips 13. The outputs of photodetectors 32 and 33 are connected to a conventional amplifying and logic circuit 34 having first and second outputs on conductors 36 and 37, respectively. The signal on conductor 36, denominated the positive blip sense signal comprises a series of electrical pulses which correspond to the passage of blips 13 past viewing station 26, when said blips are travelling in the positive direction, i.e. when the microfilm is travelling from supply spool 24 to take-up spool 23. A similar signal, the negative blip sense signal will be generated on conductor 37 when the microfilm is being rewound onto supply spool 24.

A tachometer 35, mechanically coupled to and driven by take-up motor 21, is also provided. Tachometer 35 includes an integral d.c. generator and, thus, generates a d.c. voltage which is proportional to the rate at which the take-up spool 23 is being rotated by motor 21. Of course, when rewind motor 22 is energized, the polarity of the d.c. signal developed by tachometer 36 will also reverse since the tachometer will then be running in the opposite direction.

Figure 3:
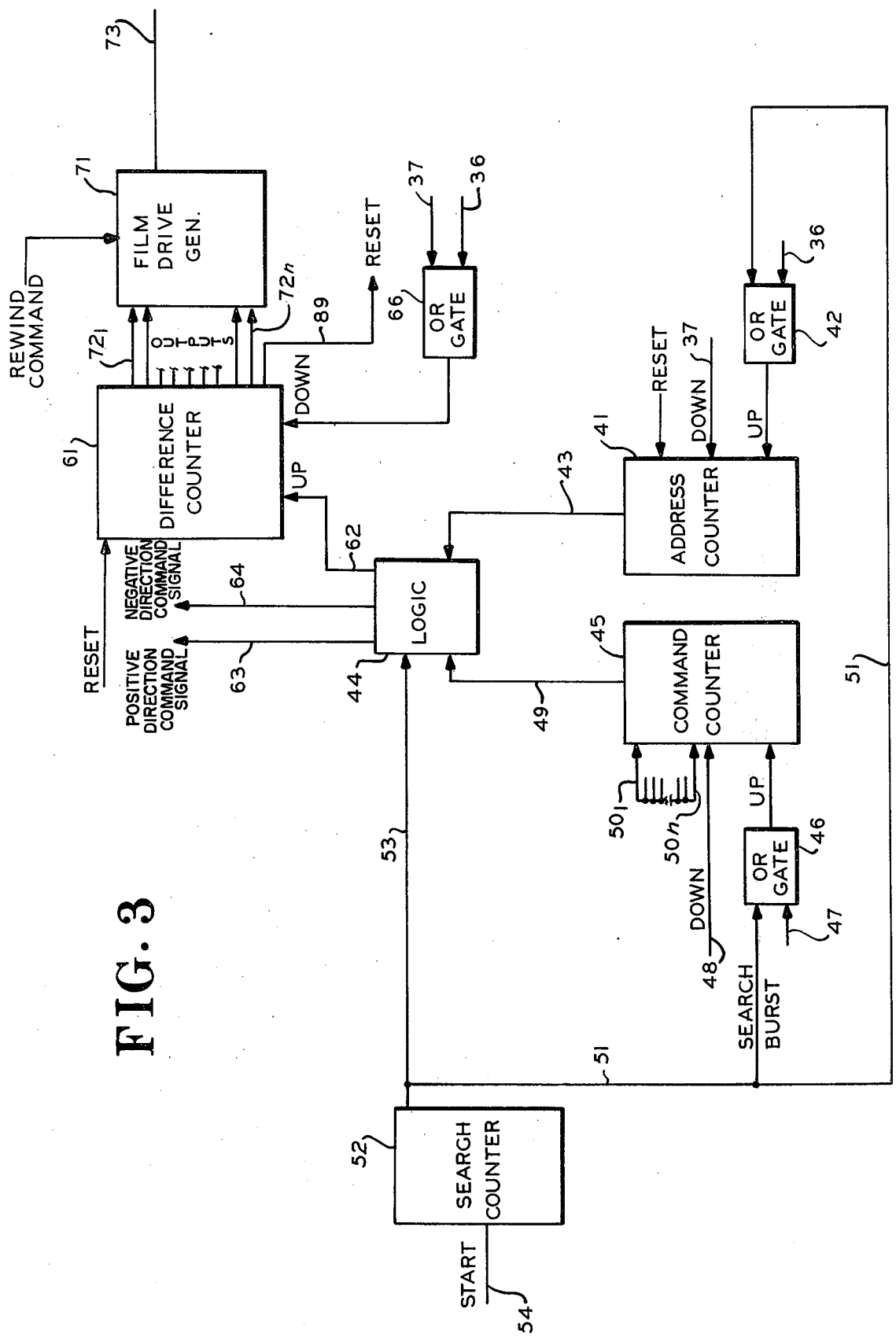
FIGS. 3 and 4, when
Figure 4:
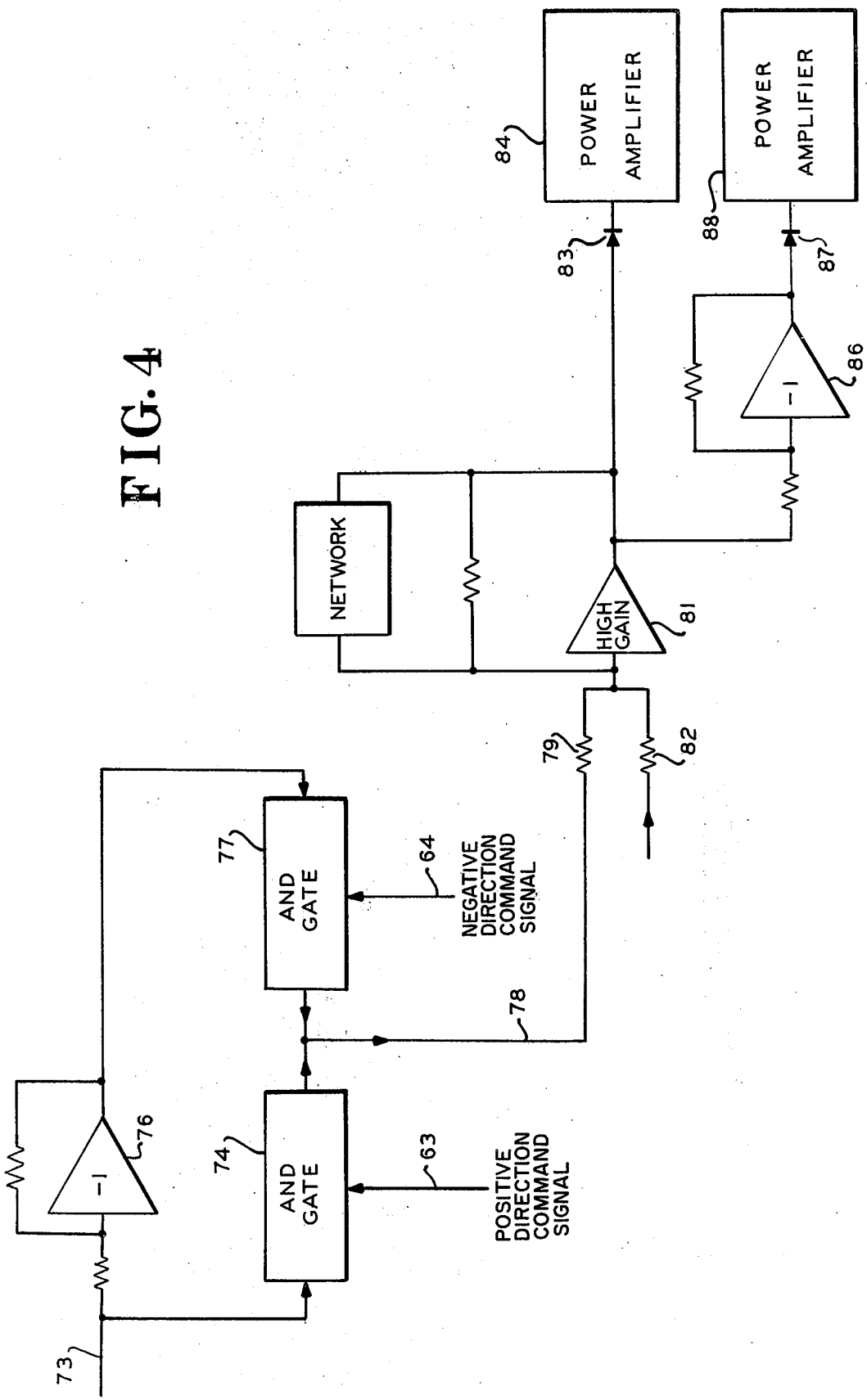

FIGS. 3 and 4, read together, illustrate in block diagram form the circuitry required to locate a given frame from the blip sense signals present on conductors 36 and 37. As shown, the circuitry includes a first "up-down" counter 41 hereafter referred to as the Address Counter. The "down"-count input to Address Counter 41 comprises the negative blip sense signal from circuit 34 on conductor 37, while the "up"-count input is connected to the output of a first OR-gate 42 having one input thereof connected to the positive blip sense signal on conductor 36. Thus, Address Counter 41 will either count up or count down, depending upon the direction of travel of microfilm 11. The overflow from counter 41 on conductor 43 is connected to a first control input of a logic circuit 44, the operation and construction of which will be described in detail later. Address counter 41, which may comprise, for example, an integrated circuit such as a type SN 74193, must, of course, have a counting capacity which is commensurate with the number of documents stored on a given reel of microfilm. In the illustrative embodiment, each reel of microfilm comprises approximately 10,000 records (Frame Nos. 0000 through 9999). Accordingly, counter 41 must be able to count up to 10,000 before generating an overflow signal on conductor 43.

A second up-down counter 45, hereafter referred to as the Command Counter, has its up-count input connected to the output of a second OR-gate 46. OR-gate 46 has one of its inputs connected, via a conductor 47, to a manually-operated "frame advance" push-button (not shown) which when operated advances the microfilm past the viewing station one frame at a time. The down-count input to Command Counter 45 on conductor 48 is similarly connected to a second, manually-operated "frame back-up" push-botton so that the microfilm may be rewound one frame at a time. The overflow output of counter 45, on conductor 49, is connected to a second control input of logic circuit 44. Command counter 45 is further provided with a plurality of input conductors $50_1$–$50_n$, a total of 16 in the illustrative embodiment, which permit manual entry, for example by pushbottons or rotary switches (not shown), of the binary equivalent of the particular microfilm frame number desired to be viewed. A corresponding input to Address Counter 41 is used to reset the count therein to zero. It is also essential that Command Counter 45 have the same counting capability as Address Counter 41, 10,000 counts in the illustrative embodiment.

The other inputs to OR-gates 42 and 46 are connected, via conductor 51, to the output of an up-counter 52, which output is also connected to the input of logic circuit 44 via conductor 53. Counter 52, hereafter called the Search Counter, must also have the same counting capability as counters 41 and 45 and, when activated by a start search command on conductor 54, for example from another manually operated push-button (not shown), feeds a burst of pulses into the up-count inputs of Command Counter 45 and Address Counter 41. In the illustrative embodiment there will be 10,000 pulses in each such search burst from counter 52.

When logic circuit 44 is open, the burst of pulses on conductor 53 from Search Counter 52 is fed into the up-count input of a third up-down counter 61, via a conductor 62. Counter 61, hereinafter referred to as the Difference Counter, must have a counting capacity at least as great as the capacity of counters 41, 45 and 52 for, as will be explained below, Difference Counter 61 stores the magnitude of the difference between the count stored in counters 41 and 45. In the illustrative embodiment, this difference can reach a maximum value of 10,000. Thus, counter 61 must have a count capacity of at least 10,000 but it can have more, if desired.

Logic gate circuit 44, which is normally closed, opens to permit search pulses from counter 52 to increment counter 61 under two different circuit conditions. The first condition occurs when there is an overflow signal present on conductor 49. A subsequent overflow signal occurring on conductor 43 will reclose gate 44 and terminate the incrementing of the count in counter 61. Under these circumstances a signal, hereinafter called the positive direction command signal, will be generated by logic circuit 44 on a conductor 63.

The second circuit condition occurs when an overflow signal is present on conductor 43. This also will open logic circuit 44. A subsequent overflow signal on conductor 49 will then close logic circuit 44. Under these circumstances, logic circuit 44 will generate a negative direction command signal on a conductor 64. Difference Counter 61 also includes a reset input to reset the count therein to zero and a down-count input which is connected, via an OR-gate 66, to conductors 36 and 37.

The operation of this portion of the circuit will now be explained in detail. The address of the microfilm frame which the viewer desires to see is first loaded into Command Counter 45, via the input conductors $50_1$–$50_n$. Assume that frame 1763 is the desired frame. Address Counter 41 contains the address of the frame currently being viewed or, if the microfilm has just been loaded into the viewing machine, the zero count priorly established therein by the reset pulse. Assume this to be the case for this illustrative example. When a start search signal is received, via conductor 54, Search Counter 52 will commence the transmission of a burst of 10,000 pulses to the up-count inputs of Command Counter 45 and Address Counter 41. Accordingly, both counters will begin to count upwards. When the count in counter 45 reaches 9999 an overflow signal will appear on conductor 49, which signal will open logic circuit 44 and permit pulses from counter 52 to increment the count in counter 61, which, of course, had priorly been reset to an initial count of 0000.

Subsequently, when the count in Address Counter 41 reaches 9999, the overflow signal on conductor 43 will close logic circuit 44, thus, terminating the incrementing of Difference Counter 61. Counter 61 will now have stored therein a count of 1763, which represents the difference between the desired frame address of 1763 and the current frame address of 0000. At the same time, logic circuit 44 will generate an output signal or lead 63 which indicates that the direction of film travel which is necessary to move the microfilm so that frame 1763 will be positioned in front of the viewing station is positive, that is to say from supply reel to take-up reel.

How the microfilm is moved to the desired frame will also be explained in detail below. Assume, for the purposes of this explanation, that it has been so moved and that frame 1763 is now positioned within the viewing station. The blip sense pulses on conductor 36 will, of course, continually advance the count in counter 41 as each blip is detected by the photodetectors, until the count has increased by 1763 blips from 0000 to 1763.

Assume further that the operator, having viewed frame 1763, now wishes to view frame 1522 and, accordingly, inputs that number into Command Counter 45. Counter 41 is currently storing a count of 1763, corresponding to the frame address of the currently viewed frame. Immediately after the desired frame address has been loaded into Command Counter 45, conventional pulse circuitry (not shown) generates a "search execute" pulse. The leading edge of this pulse is sensed and used to reset the count in Difference Counter 61 to zero. The trailing edge of the execute pulse is also detected and starts the count in Search Counter 52. Since the count in counter 41 is now greater than the count in counter 45, the first overflow signal will appear on conductor 43 and this overflow signal will open logic circuit 44. Subsequently, counter 45 will also overflow and, as before, Difference Counter 61 will store the difference between the two counts, that is $241 = 1763 - 1522$. Because counter 41 overflowed prior to counter 45, logic circuit 44 will generate a minus direction command, on conductor 64, indicating that the microfilm must be run backwards, i.e. from the take-up spool back onto the supply spool. When this is done, the negative blip sense signals on conductor 37 will decrease the count on Address Counter 41 by 241 blips, i.e. from 1763 to 1522 so that Address Counter 41 once again correctly stores the address of the frame currently positioned in the viewing station.

As shown in FIG. 3, a Film Drive Generator 71 is connected to, and driven by, the outputs $72, -72_n$ of Difference Counter 61. Generator 71, to be described in detail below, generates a voltage which is proportional to the count in counter 61 and this voltage is utilized to drive the take-up and rewind motors in the appropriate directions. The output from Drive Generator 71, on conductor 73, is applied to one input of a first transmission-gate 74 and, via a unity-gain operational amplifier 76 acting as an inverter, to the corresponding input of a second transmission-gate 77. First transmission-gate 74 receives as its enabling input the positive direction command signal from logic circuit 44 on conductor 63, while second transmission-and gate 77 similarly receives the negative direction command signal on conductor 64.

The outputs from transmission-gates 74 and 77 are connected, via a conductor 78, to a summing resistor 79, thence to the input of a high-gain operational amplifier 81. The output from tachometer 35 (FIG. 1) is also connected to the input of amplifier 81, via a second summing resistor 82. The output of amplifier 81 is connected, via a protective diode 83, to the input of a first power amplifier 84 which supplies the power necessary to drive take-up motor 21. The output of amplifier 81 is also connected, via an inverting operational amplifier 86 and a second protective diode 87, to the input of a second power amplifier 88 which supplies the power necessary to drive rewind motor 22.

As soon as logic circuit 44 terminates the count in Difference Counter 61, that is, when Difference Counter 61 is storing the difference between the actual frame address and the desired frame address, Film Drive Generator 71 develops a voltage which is proportional to the magnitude of the count stored therein. Assume that the count in Command Counter 45 is greater than the count in Address Counter 41, i.e., that the microfilm must be advanced from the supply spool onto the take-up spool. As previously discussed, under these circumstances there will be a positive direction command signal on conductor 63 and this signal will enable transmission-gate 74 permitting the film velocity command voltage on conductor 73 to drive take-up motor 21 in the forward direction (clockwise).

Initially, the film transport is at rest and the output voltage from tachometer 35 will be zero. Thus, the voltage applied to the motor drive power amplifiers will be at its maximum level and the drive motor will rapidly accelerate the microfilm. However, as the film picks up speed, the output voltage from tachometer 35 will increase. This voltage is opposite in polarity to the voltage on conductor 73 and, when summed therewith in resistors 79 and 82, tends to reduce the voltage applied to the input of the power amplifiers. If the takeup motor 21 is running at the precise speed dictated by the command voltage, then the output of amplifier 81 will be reduced to zero. In general, however, there will always be a residual error signal which is just sufficient to drive the film transport system at the commanded velocity or close to it.

In the illustrative embodiment, the total time taken to generate the search burst is in the order of 15 milliseconds, of which, in general, no more than 5 milliseconds are needed to enter the count into the Difference Counter. Because of the mechanical inertia in the transport system, the film will not have had time to begin moving and there will, thus, be no blip pulses generated on either conductor 36 or 37 until after the search count has been completed.

As the film begins to move, however, photodetectors 32 and 33 start to detect the presence of blips on the microfilm and the signals on conductors 36 or 37 begin to decrement the count in Difference Counter 61 and, depending upon the direction of film travel, to either increment or decrement the count in Address Counter 41.

As the count in Difference Counter 61 falls, so does the output voltage from Film Drive Generator 71. This, in turn, slows the rate at which the film is advanced through the transport mechanism and when the count in Difference Counter 61 has been reduced to zero, the desired frame will be positioned in the viewing station.

When the count in Address Counter 41 is greater than the count loaded into Command Counter 45, the negative direction command signal on conductor 64 will enable transmission gate 77 and the signal on conductor 73, inverted by amplifier 76, will drive the rewind motor in the reverse direction. Otherwise, the operation of the circuitry is entirely analagous.

Advantageously, the output voltage from Film Drive Generator 71 is not directly proportional to the count in Difference Counter 61.

As will be explained, to account for the mechanical inertia of the moving film, the output voltage from generator 71 is reduced in discrete steps when certain specified counts are reached in Difference Counter 61. An additional output from Difference Counter 61, on conductor 89, indicates when the count stored therein has been reduced to zero. This output is used as a reset signal for various circuit elements, including logic circuit 44.

FIG. 5 depicts one illustrative embodiment for the logic circuit 44. As shown, this circuitry comprises a first flip-flop 91 having as its set input the overflow signal from Command Counter 45 on conductor 49. A second flip-flop 92 similarly has as its set input the overflow signal on conductor 43 from Address Counter 41. The outputs from flip-flops 91 and 92 are connected to the inputs of an Exclusive-OR circuit 93 whose output is connected to one input of a NAND-gate 96. The other input to NAND-gate 96 receives the search burst from Search Counter 52, via conductor 53, while the output thereof is connected to the up-count input of Difference Counter 61 on conductor 62. The output of flip-flop 91 is also connected to one input of a NAND-gate 101 the output of which is connected to the set input of a third flip-flop 102. In like manner, the output of flip-flop 92 is connected to one input of another NAND-gate 103, the output of which is connected to the set input of a fourth flip-flop 104. The inverted outputs from flip-flops 102 and 104 are connected to another NAND-gate 106 whose output drives both inputs of inverter 107. The output of inverter 107 is utilized as the other input to NAND-gates 101 and 102. The non-inverted output of flip-flop 102 comprises the positive direction command signal on conductor 63, while the corresponding output from flip-flop 104 comprises the negative direction command on conductor 64.

In operation, assume that Command Counter 45 overflows before Address Counter 41. The overflow signal on conductor 49 will set flip-flop 91 which, in turn will open Exclusive-OR gate 93. Exclusive-OR gate 93 will then enable NAND-gate 96 so that the search burst on conductor 53 will pass over conductor 62 to increment the count in Difference Counter 61. Since the inverted output from flip-flop 102 and 104 are both "low," NAND-gates 106 and 107 will enable both NAND-gate 101 and NAND-gate 103. However, since only flip-flop 91 is set at this time, only gate 101 will open, thus setting flip-flop 102. The output of flip-flop 102 will go "high," thus generating the positive direction command signal on conductor 63. At the same time, the inverted output thereof will go low thus inhibiting NAND-gate 103 so that when flip-flop 92 is subsequently set by an overflow from the Address Counter 41, it will not be possible to set flip-flop 104 and generate an erroneous negative direction command signal on conductor 64.

When Address Counter 41 does overflow, flip-flop 92 will be set and the second input to Exclusive-OR gate 93 will close NAND-gate 96 thereby preventing any further burst pulses from Search Counter 52 from reaching the up-count input of Difference Counter 61. When the count in Difference Counter 61 is ultimately reduced to zero, i.e. by movement of the microfilm to the desired frame address, the reset signal therefrom on conductor 89 will re-set flip-flops 102 and 104. Flip-flops 91 and 92, on the other hand, are re-set by the start signal applied to Search Counter 52. The circuitry of FIG. 5 operates in an entirely analagous manner when Address Counter 41 overflows prior to Command Counter 49.

FIG. 6 illustrates an illustrative embodiment for the Search Counter 52 which includes a clock 111. Clock 111 generates a continuous train of pulses which are fed to a NAND gate 112, the output of which is connected to a plurality of serially connected binary counter stages $113_1$–$113_4$ and also, via conductor 53, to NAND-gate 96 in logic circuit 44. When a start signal is received on conductor 54, transistors $Q_1$ and $Q_2$ enable NAND-gate 112 permitting clock pulses from clock 111 to drive counter stages $113_1$–$113_4$. When the count in counter stages $113_1$–$113_4$ reaches the desired number, 10,000 in the illustrative embodiment, transistors $Q_1$ and $Q_2$ disable gate 112, thus, preventing any further clock pulses from clock 111 from further advancing the count in binary counting stages $113_1$–$113_4$. Conductor 51 which feeds the search burst to OR-gates 42 and 46 (FIG. 1) is also connected to the output of NAND-gate 112. In actual operation, the counter is disabled when all counting stages are at 0 count, which is the reset condition.

Figure 7:
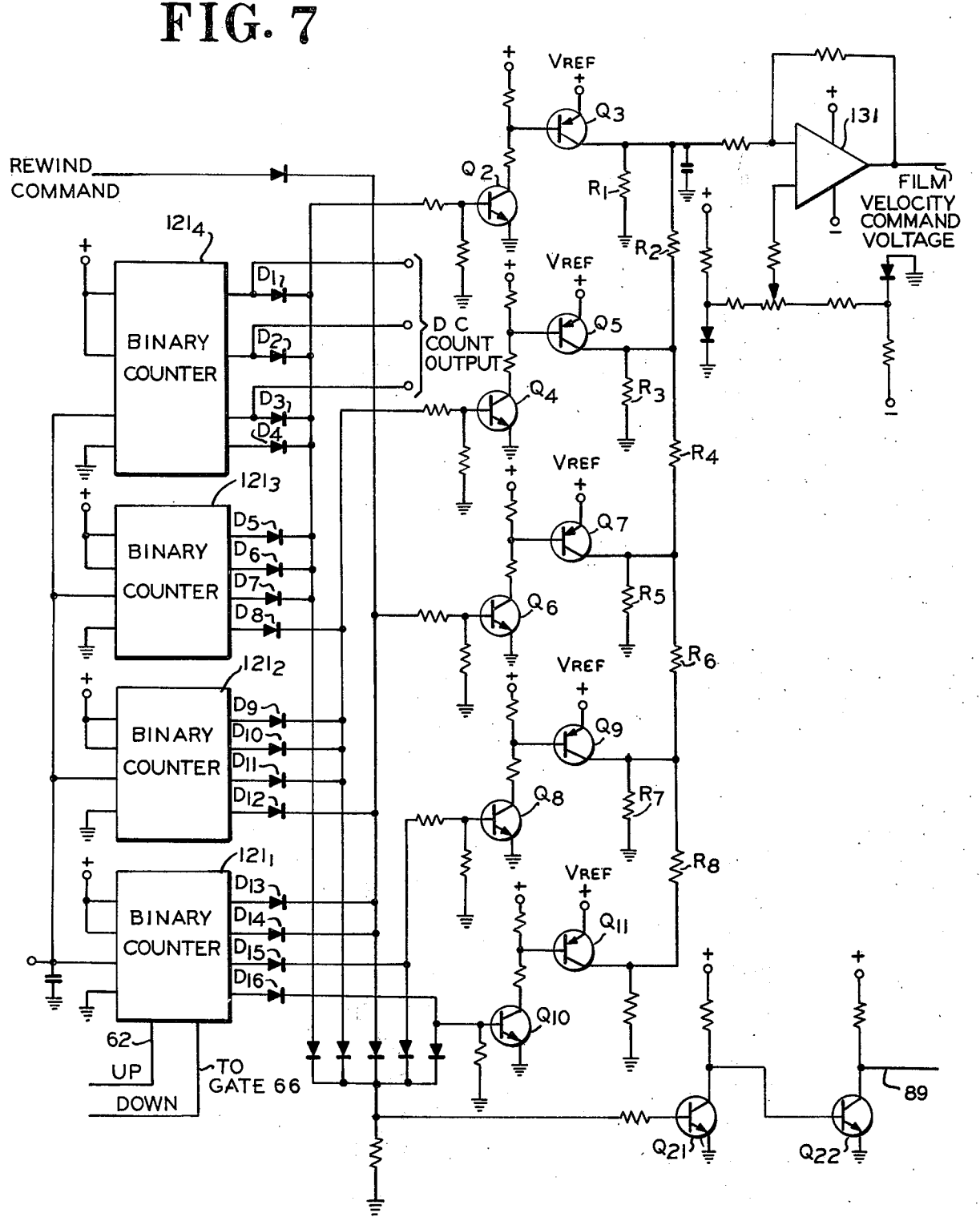
FIG. 7 is a block diagram schematic of an illustrative embodiment of the microfilm drive voltage generator.

FIG. 7 depicts an illustrative embodiment for the Film Drive Generator 71 as well as Difference Counter 61. As shown, Difference Counter 61 comprises a conventional up-down binary counter having four interconnected stages $121_1$–$121_4$. The up-count input of the counter is connected to the output of NAND-gate 96 (FIG. 5), via conductor 62, while the down-count input is connected to OR-gate 66 (FIG. 1). The generator 71 includes a resistance ladder network comprising resistors $R_1,R_2$; $R_3,R_4$; $R_5,R_6$; and $R_7,R_8$. Each stage in the resistance ladder is connected to the output of a two stage transistor amplifier. Transistors Q3 and Q4, when energized, supply current to resistors $R_1$ and $R_2$; transistors $Q_5$ and $Q_6$ supply current to resistors $R_3$ and $R_4$; and, so on. Transistors $Q_1$, $Q_4$, $Q_6$, $Q_8$ and $Q_{10}$ are gated "on" by means of a series of diode gates connected to selected outputs of the stages $121_1$–$121_4$ of the up-down counter. For example, transistor $Q_{10}$ is controlled by diode $D_{16}$, $Q_8$ by diode $D_{15}$, $Q_6$ by diodes $D_{12}$, $D_{13}$, $D_{14}$, $Q_4$ by diodes $D_8$, $D_9$, $D_{10}$, $D_{11}$ and $Q_2$ by diodes $D_1$, $D_2$, $D_3$, $D_4$, $D_5$, $D_6$ and $D_7$. The summed voltages appearing across each stage of the ladder network are amplified by an operational amplifier 131 whose output, on conductor 73, is fed to AND-gate 74 and inverter 76 in FIG. 1. Transistor $Q_2$ is, thus, controlled by all the outputs of counter stage $121_4$ and the three most significant outputs of stage $121_3$, OR-gated through diodes $D_1$–$D_7$. Likewise transistor $Q_4$ is controlled by the least significant output of stage $121_3$ and the three most significant outputs of counter stage $121_2$, OR-gated through diodes $D_8$ and $D_{11}$. Transistor $Q_6$ is controlled by the least significant output of counter $121_2$ and the two most significant outputs of counter $121_1$, OR-gated through diodes $D_{12}$–$D_{14}$. Transistor $Q_8$ is controlled by the second least significant output of counter $121_1$ and transistor $Q_{10}$ is controlled by the least significant output of the entire counter.

In operation, assume that the search burst on conductor 62 causes the counter stages $121_1–121_4$ to count up to 9999. In this condition, all of the diodes $D_1–D_{16}$ will be conducting and transistors $Q_2, Q_4 \ldots Q_{10}$ will conduct. Thus, the highly stable reference voltage $V_{REF}$ will supply current to all five stages of the resistance ladder and the summed voltage at the input to the operational amplifier 131 will attain its maximum value.

As the count in the counter starts to drop, first diode $D_1$ will be back-biased, then $D_2$ and so on. When diode $D_7$ is back-biased, transistor $Q_2$ turns "off," thus turning off transistor $Q_3$ and removing the contribution of resistors $R_1$ and $R_2$ to the input of amplifier 131. As the count continues to drop, transistor $Q_4$ will turn off, then $Q_6$, then $Q_8$ and finally, when the desired frame is positioned in the viewing station, $Q_{10}$ will turn off.

As the various transistors associated with the ladder network switch-off the output of amplifier 131, that is to say the film velocity command voltage, becomes closer and closer to zero, thus, slowing the movement of the microfilm and eventually halting it completely. In the illustrative embodiment, transistor $Q_2$ will turn-off when the count drops to 199, i.e. when the frame currently positioned in the viewing station is within 199 frames of the desired frame. Transistor $Q_4$ will likewise cut-off when the count falls to 19, $Q_6$ when the count falls to 3, $Q_8$ when the count falls to 1, and $Q_{10}$ when the count falls to zero. When this latter event occurs transistors $Q_{21}$ and $Q_{22}$ will provide a reset pulse on conductor 89, as previously discussed.

It will be apparent that the invention, although described with reference to a microfilm retrieval system, is not so limited but may be used with equal facility with any strip record medium, such as videotape, motion picture film, computer tape, punched paper tape, etc. Further, the invention is not limited to reel-to-reel systems but may be used with cartridges, cassettes, etc. whether continuous or reel-to-reel within the cassette itself.

One skilled in the art can make various changes to the arrangement of parts shown without departing from the spirit and scope of the invention.

What is claimed is:

1. A frame location system for use with a strip record medium retrieval device of the type that includes means for moving the strip record medium past a predetermined station, said strip record medium containing $m$ frames, each frame having a unique address, which comprises:
   a first reversible counter having a counting capacity of $m$ pulses for storing the address of a selected frame to be moved to said predetermined station and generating an overflow signal when the accumulative count applied thereto exceeds $m$;
   a second reversible counter having a counting capacity of $m$ pulses for storing the address of the frame presently at said predetermined station and generating an overflow signal when the accumulative count applied thereto exceeds $m$;
   a third reversible counter, having a counting capacity of $m$ pulses connected to said first and second reversible counter, for determining the difference between the addresses stored therein;
   means responsive to the application of a start search command from an external source, for generating a burst of $m$ pulses;
   means for connecting the output of said pulse generating means to the up-count inputs of said first and second reversible counters to cause said counters to overflow;
   logic means, connected to said first and second reversible counters, for routing pulses from said burst of pulses to the up-count input of said third reversible counter upon receipt of a first overflow signal from either said first or said second reversible counter and for terminating the same upon receipt of a second overflow signal from either said second or said first reversible counter; and
   means, responsive to said address difference, for actuating said strip record moving means, whereby said selected frame is presented at said predetermined station.

2. The system according to claim 1 wherein said logic means includes means for generating a first direction command signal if said first reversible counter overflows prior to said second reversible counter and a second direction command signal if said second reversible counter overflows prior to said first reversible counter.

3. The system according to claim 2 wherein said strip record moving means includes first and second reversible motor means and first and second power amplifiers therefor:
   said actuating means comprises voltage generating means, connected to said third reversible counter, for generating a voltage proportional to the instantaneous count stored therein, and said system further comprises:
   first gating means, opened upon receipt of said first direction command signal, for connecting the output of said voltage generating means to the power amplifier of said first motor means and, via an inverting amplifier, to the power amplifier of said second motor means, whereby said first motor means advances said strip record medium in a first direction; and
   second gating means, opened upon receipt of said second direction command signal, for connecting the inverted output of said voltage generating means via an inverting amplifier to the power amplifier of said second motor means, whereby said first and second motor means advance said strip record medium in a second direction.

4. The system according to claim 3 wherein each frame on said strip record medium has associated therewith an identifying indicium, and said system further comprises:
   means for detecting the presence of said indicium; and
   means, connected to said detecting means, for determining the direction of travel of said indicium past said detecting means, said direction determining means producing a first output signal for a first direction of travel and a second output signal for the second direction of travel.

5. The system according to claim 4 further including means for supplying either the first or the second output signal from said direction determining means to the down-count input of said third reversible counter so that, as said strip record medium is moved to bring said selected frame to said predetermined station, the count in said third reversible counter is reduced towards zero, thereby reducing the output of said voltage generating means towards zero.

6. The system according to claim 5 further comprising means for connecting the first output signal from said direction determining means to the up-count input of said second reversible counter and the second output signal from said direction determining means to the down-count input of said second reversible counter.

7. The system according to claim 6 wherein said strip record medium is a microfilm, said indicia comprises opaque regions photographically recorded on an edge of said microfilm, proximate each frame thereof, and said indicia detecting means includes first and second photodetectors for optically sensing the presence of said indicia.

8. The system according to claim 7 further comprising:
means, coupled to and driven by said second motor means, for generating a d.c. voltage directly proportional to the speed of rotation thereof; and
means for summing the output of said d.c. generating means with the output of said voltage generating means, after it has been gated through either said first or second gating means, thereby to generate an error signal tending to maintain said first and second motor means rotating at a speed dictated by the magnitude of the output from said voltage generating means.

9. The system according to claim 7 wherein the output of said voltage generating means is non-linear with respect to the count stored in said third reversible counter, whereby said microfilm is gradually slowed as said selected frame approaches said predetermined station.

10. The system according to claim 9 wherein said voltage generating means comprises:
a source of a stable reference potential;
a resistance ladder network having a plurality of taps thereon;
a corresponding plurality of amplifier stages, each selectively connecting said reference potential to the corresponding tap on said network when activated; and
a corresponding plurality of OR-gates interconnecting selected counts on said third reversible counter to corresponding amplifier stages so that as the count stored in said third counter is reduced, successive amplifier stages disconnect the taps in said network from said reference potential, whereby the voltage developed across said network falls in a discontinuous, step-wise, non-linear manner.

* * * * *